United States Patent [19]

Dugan et al.

[11] Patent Number: 4,579,891

[45] Date of Patent: Apr. 1, 1986

[54] FELDSPAR CONTAINING PROTECTIVE COMPOSITION

[75] Inventors: William E. Dugan, Allison Park; Charles T. Roland, Sr., Bethel Park, both of Pa.

[73] Assignee: Miraco, Inc., Wexford, Pa.

[21] Appl. No.: 668,646

[22] Filed: Nov. 6, 1984

[51] Int. Cl.⁴ .................................................. C08K 3/00
[52] U.S. Cl. ........................................ 524/5; 524/446; 524/447
[58] Field of Search ............................. 524/5, 446, 447

[56] References Cited

U.S. PATENT DOCUMENTS 4,225,649 9/1980 Peterson .............................. 428/383

Primary Examiner—Paul R. Michl
Assistant Examiner—Alex H. Walker
Attorney, Agent, or Firm—Webb, Burden, Robinson & Webb

[57] ABSTRACT

A feldspar containing protective composition for paving, coating, sealing and the like includes a dry component mixed with a liquid component in an amount necessary to produce a desired consistency of the composition. The dry component includes about 40-50% by weight of feldspar aggregate, about 35-40% by weight of a mineral powder, such as a pottery grade feldspar, up to about 15% by weight of masonry mortar and up to about 7% by weight of cement. The total amount of masonry mortar and cement is at least about 10% by weight of the dry component. The liquid component is formed of an adhesive copolymer in an aqueous emulsion, such as ethylene vinyl acetate.

17 Claims, No Drawings

FELDSPAR CONTAINING PROTECTIVE COMPOSITION

BACKGROUND OF THE INVENTION (1) Field of the Invention

This invention relates to all purpose protective compositions for paving, coating, sealing and the like and, more particularly, to a feldspar containing protective composition for paving, coating and sealing.

(2) Background Art

The use of protective compositions for paving, coating and sealing a wide variety of surfaces (hereinafter referred to generally as "protective compositions") is well known in the art. Such protective compositions generally include a dry, powdered component which is mixed with a liquid component at the time of application. The protective composition may be applied by troweling, rolling, brushing, brooming, spraying or the like and the consistency of the composition is adjusted according to the particular method of application being used. The dry component of such protective compositions usually includes a mineral aggregate, a powdered mineral, and powdered cement and/or masonry mortar. A commonly used mineral is limestone. Various liquid components have been used, including water and adhesive copolymers in an aqueous emulsion. One example of a prior art limestone based protective composition is sold by Miraco, Inc., the assignee of the present invention, under the registered trademark MIRACOTE ®. MIRACOTE ® is relatively flexible when compared to prior cementitious compositions which tend to be hard and inflexible.

Due to the limited hardness of limestone, its rather uneven appearance, and its uneven particle size, limestone containing products have a limit to their strength and wearability and tend to have an overall appearance which is bland and uneven. It is, accordingly, an object of the present invention to provide a protective composition with the advantages of prior limestone based compositions, but which will have increased durability, a more attractive and uniform appearance, and which is easier to apply.

BRIEF DESCRIPTION OF THE INVENTION

Accordingly, the present invention is a feldspar containing protective composition or the like which includes a dry component and a liquid component mixed together in an amount necessary to produce a desired consistency.

The dry component contains about 40–50% by weight of feldspar aggregate, about 35–40% by weight of a mineral powder, up to about 15% by weight of masonry mortar, and up to about 7% by weight of cement. The total amount of masonry mortar and cement included in the dry component is at least about 10% by weight. The mineral powder is preferably a pottery grade feldspar. The masonry mortar may be included in an amount from about 10–15% by weight, and preferably 13% by weight, and the cement may be included in an amount from about 3–7% by weight, and preferably 4% by weight. The pottery grade feldspar in the dry component is preferably about No. 200 grade mesh in particle size and is included in an amount about 38% by weight. The dry component preferably includes about 45% by weight of feldspar aggregate with a particle size of about No. 20 grade mesh. The dry component may also include up to about 1% by weight of stearic acid and up to about 0.1% by weight of a powdered waterproofing agent. All mesh sizes herein are given in U.S. Standard.

The liquid component is formed of an adhesive copolymer in an aqueous emulsion. The liquid component is preferably ethylene vinyl acetate and may further include up to about 55% by weight of water, up to about 1% by weight of a defoamer, and up to about 1% by weight of aqua ammonia.

DETAILED DESCRIPTION OF THE INVENTION

The composition of the present invention is an all purpose protective material which includes feldspar aggregate rather than the limestone aggregate used in prior protective compositions. The protective composition comprises a dry component and a liquid component which are mixed together at the time of application.

The dry component of the present invention contains about 40–50% by weight of larger feldspar particles, called feldspar aggregate, which has a particle size on the order of No. 10 or 20 mesh measured in accordance with U.S. Standard. The dry component also includes from about 35–40% by weight of a mineral powder, also referred to as mineral fines. A preferred mineral powder is a feldspar powder, such as a pottery grade feldspar, which has a particle size on the order of No. 100 or 200 mesh, or smaller, measured in accordance with U.S. Standard. The balance of the dry component is constituted by up to about 15% by weight of powdered masonry mortar and up to about 7% by weight of powdered cement, wherein the total amount of masonry mortar and cement included is at least about 10% by weight. The powdered masonry mortar may be included in an amount of about 10–15% by weight, and preferably about 13% by weight; the powdered cement inclusion may be about 3–7% by weight, and preferably about 4% by weight. The dry component may also include up to about 1% by weight of powdered stearic acid to lubricate the dry component and keep it dry and powdery until it is used. The stearic acid also functions as a dispersant when the dry and liquid components are mixed. The dry component may also include up to about 0.1% by weight of a powdered waterproofing agent. When discussing the amounts of the various ingredients of the dry component, the reference to "% by weight" refers to a percentage of the weight of the dry component alone, but not to a percentage of the weight of the protective composition formed when the dry and liquid components are mixed together.

Feldspar is a group of crystalline minerals that consist of aluminum silicates with either potassium, sodium, calcium or, rarely, barium and these are the essential constituents of nearly all crystalline rocks. Feldspar has a hardness of 6–6.5 and a specific gravity of 2.5–2.9. In contrast, limestone is a rock that is formed chiefly by the accumulation of organic remains, such as shells or corals, and consists mainly of calcium carbonate.

In a preferred embodiment, the dry component of the present composition includes about 38% by weight of pottery grade feldspar which has a No. 200 grade mesh particle size. A suitable pottery grade feldspar is manufactured by the Feldspar Corporation of Spruce Pine, N.C. and sold under the designation NC-4 Pottery Spar. The feldspar aggregate is preferably included in an amount of about 45% by weight and has a particle size of approximately No. 20 grade mesh. A suitable feldspar aggregate is Feldspar Corporation F-20 Spar.

The cement in the dry component is preferably a waterproof cement, such as the Waterproofed White Portland Cement sold by the Medusa Corporation, Cleveland, Ohio. The masonry mortar, also known in the art as masonry cement, may be selected in either gray or white depending on the desired color of the composition. Acceptable products include Medusa BrikseT, a gray masonry mortar, and Medusa StoneseT, a white masonry mortar. A preferred stearic acid is Sonneborn Hydrocyde and a preferred waterproofing agent is Vinac manufactured by Air Products and Chemicals, Inc., Allentown, Penna.

The various ingredients of the dry component are blended and thoroughly mixed for a period of time as determined by the size of the batch.

The liquid component of the present invention is formed of an adhesive copolymer in an aqueous solution. A preferred liquid component is ethylene vinyl acetate such as Elvace 1875 ethylene vinyl acetate, manufactured by Reichold Chemicals, Inc., White Plains, N.Y. If it is desired to dilute the ethylene vinyl acetate, the liquid component may include up to about 55% by weight of water, preferably salt-free tap water. To reduce the formation of air bubbles in the liquid component and in the protective composition itself, the liquid component may include up to about 1% by weight of a defoamer, such as NDW Defoamer, made by Diamond Shamrock Corporation, Dallas, Tex. In addition, up to about 1% by weight of a liquid ammonia, such as Aqua Ammonia, manufactured by Allied Corporation, Morristown, N.J., may be included in the liquid component to adjust the pH level as needed. Alternatively, acrylic binders or styrene butadiene binders may be substituted for the ethylene vinyl acetate in the liquid component although the use of ethylene vinyl acetate is preferable. The weight percentages identified above refer to the weight of the liquid component alone.

To form the composition of the present invention, the dry component and liquid component, discussed above, are mixed together and thoroughly blended to form a homogenous mixture which is smooth, lump free, uniform and easily poured. It is preferable that the dry component should be added to and mixed into the liquid component rather than vice versa. The dry and liquid components are mixed together at the time of application because the composition will quickly set to a dry, solid mass. The use of power driven mixing equipment is advantageous over hand mixing except possibly when mixing very small quantities.

The proportions of dry and liquid components which are mixed together are determined by the desired consistency of the final composition. The desired consistency will be determined by various factors, including the method of application involved, whether the application area will be hot or breezy, whether the application is the first or second coat, and the size of the application involved. For example, if the composition is to be sprayed on a particular surface, the composition would be more liquid (i.e., thinner) than if the composition is to be applied with a trowel. Also, the first coat slurry should be thinner than that for the second coat.

The composition may be applied with a broom, brush, roller, trowel, or squeegee, or it may also be applied by spraying. The composition is a multipurpose, super bonding, protective coating, sealing and paving composition which can be applied to a wide variety of interior or exterior surfaces, whether the surface is vertical, horizontal, or sloped. It will adhere to concrete, brick, wood, fiberglass, steel, aluminum, styrofoam, urethane, asphalt, glass, masonry and almost any other material except for certain plastics or hard rubber materials which have a very slippery surface. The composition can be used for renovating old buildings, as well as in new construction. It can be used for water resistance in basements, for sealing decks, and for providing excellent anti-skid safety flooring. The composition may be advantageously applied to wearing surfaces such as sidewalks, ramps, parking decks, steps, bridge decks, and walkways. It has good water-resistant properties because it forms a tough membrane that bonds tightly to the substrate and has good bonding qualities to assure complete sealing while at the same time allowing the substrate to breathe. Because the composition contains mineral aggregate, it may be applied to simulate brick, stone, and various stucco wall finishes as well as to serve as insulation protection over beadboard and sprayed-in-place insulation. It is useful for swimming pool linings and industrial tank exteriors.

The composition of the present invention has a number of advantages over previously known and used limestone based materials. The composition is more wear resistant, corrosive resistant and harder due to the presence of feldspar. At the same time the composition retains the desired flexibility of limestone based compositions. Feldspar has a more consistent and uniform granular size and is a crystalline material that must be cut or split and will not flake like limestone. Furthermore, unlike feldspar, limestone under compression will turn into a powder. The composition is much easier to apply, particularly by brooming, spreading, brushing, squeegeeing or the like, and has a ball bearing type of action because of the rounded shape of the feldspar particles. The coverage of the feldspar containing composition is noticeably better than that for limestone based compositions. For example, a particular unit (consisting of approximately 15-33 lbs. dry to 1 gal. liquid) of MIRACOTE® will cover approximately 200 square feet whereas a unit of the present composition will provide about 15% more coverage. This may be a function of the rheology or improved flow characteristics of the feldspar based composition. The feldspar containing composition has a more uniform appearance and has a more uniform profile when compared with limestone compositions. The color of the feldspar composition is much more consistent. Unlike feldspar, limestone is much more absorbent and color tends to show in blotches. The feldspar composition is perceived to be lighter at night, probably because of the crystalline character of the feldspar which is or appears to be light reflective. In addition, the feldspar composition stays cleaner than limestone compositions.

Finally, the protective composition of the present invention meets all applicable governmental standards including those for food preparation areas, reservoirs and potable water sources.

The following examples are not intended to limit the scope of the present invention, but are included for purposes of illustration.

EXAMPLE I

The dry component of a test laboratory batch composition was formulated from the following dry ingredients:

| | |
|---|---|
| (1) Feldspar Corp. NC-2 feldspar pottery spar, 200 grade mesh size | 2 lbs. |
| (2) Feldspar Corp. F-20 feldspar aggregate, 20 grade mesh size | 2 lbs., 7 oz. |
| (3) Medusa StoneT white masonry mortar | 8½ oz. |
| (4) Medusa Waterproof White Portland Cement | 5½ oz. |
| (5) Sonneborn Hydrocyde, stearic acid | ½ oz. |

The dry ingredients were blended together and mixed, using a ½ inch variable speed drill and Jiffy mixer, for approximately 10 minutes.

The liquid component of the composition was Du-Pont #1875 ethylene vinyl acetate, which is no longer available from DuPont. A 1½ lb. sample of the dry component was mixed with 8 oz. of the ethylene vinyl acetate. After thoroughly mixing the dry and liquid components together, the finished material, i.e., the actual protective composition, was applied to the following samples:
(a) a 9 inch strip of Batuband;
(b) a 6 inch strip of Miracote Batuband;
(c) a 3 inch×5 inch block of styrene beadboard;
(d) a 10 inch×18 inch block of concrete.
In addition, a 4 inch×9 inch strip of the composition was applied to wax paper for purposes of making a film and a 3 inch diameter plastic container was filled to a depth of ¼ inch in order to observe the profile of the composition.

The composition had a very creamy and smooth appearance and was very easy to apply. The composition had a consistency and ease of application noticeably better than commerically available MIRACO-TE ®. The samples were then set out to dry.

On the following day, another portion of the previously blended dry component was mixed with the liquid component to form the composition for a second coat. The composition for the second coat was mixed slightly heavier or thicker than the first coat and all of the above samples were given a second coat.

Again, the composition was easy to work with, had a creamy and smooth appearance, and was easy to apply. The samples were then allowed to cure for two days.

A visual inspection of the dry samples was made. All of the samples were found to have a uniform aggregate spread, were easy to flex without cracking, were free of pinholes, and had a whiteness comparable to MIRACO-TE ®.

EXAMPLE II

In this example, one unit of a feldspar containing protective composition was prepared. The dry component of the composition was formed of the following dry ingredients mixed together:

| | |
|---|---|
| (1) Feldspar Corp. NC-4 Pottery Spar | 41.32 lbs. |
| (2) Feldspar Corp. F-20 Spar | 49.58 lbs. |
| (3) Medusa BrikseT gray masonary mortar | 14.46 lbs. |
| (4) Medusa Waterproofed White Portland Cement | 4.30 lbs. |
| (5) Sonneborn Hydrocyde | .34 lbs. |
| TOTAL | 110.00 lbs. |

The liquid component of this example was formed of the following ingredients mixed together:

| | |
|---|---|
| (1) Elvace 1875 Ethylene Vinyl Acetate | 22.275 lbs. |
| (2) Diamond Shamrock NDW Defoamer | .150 lbs. |
| (3) Salt-free tap water | 18.00 lbs. |
| TOTAL | 40.325 lbs. |

EXAMPLE III

In this example, a batch size of the feldspar containing protective composition was prepared. The dry component of the composition in this example was formed of the following dry ingredients mixed together:

| | |
|---|---|
| (1) Feldspar Corp. NC-4 Pottery Spar | 800 lbs. |
| (2) Feldspar Corp. F-20 Spar | 960 lbs. |
| (3) Medusa StoneseT white masonry mortar | 280 lbs. |
| (4) Medusa Waterproofed White Portland Cement | 83 lbs. |
| (5) Sonneborn Hydrocyde | 6 lbs. |
| (6) Air Products and Chemicals' Vinac | 1 lb. |
| TOTAL | 2130 lbs. |

The liquid component of this example was formed of the following ingredients mixed together:

| | |
|---|---|
| (1) DuPont Ethylene Vinyl Acetate | 660 gal. |
| (2) Salt-free tap water | 675 gal. |
| (3) Diamond Shamrock Nopco NDW Defoamer | 25 lbs. |
| (4) Allied Corporation Aqua Ammonia - 26% B.E. | 3 lbs. |

The 2130 lb. batch of the dry component will make 19 units or 38 bags of the finished powder. The 1335 gallon batch is sufficient to make 250 5-gallon pails of the liquid component.

Although none of the compositions of the Examples was pigmented, it is broadly within the contemplation of the invention that pigments may be added to the composition, if desired.

Although the invention has been described with reference to specific materials and specific conditions, it is to be understood that the invention may be otherwise embodied in the following claims.

What is claimed is:

1. A protective composition comprising a dry component and a liquid component mixed together in an amount necessary to produce a desired consistency of the protective composition, said liquid component formed of an adhesive copolymer in an aqueous emulsion and said dry component including
  (a) about 40–50% by weight of feldspar aggregate;
  (b) about 35–40% by weight of a mineral powder;
  (c) up to about 15% by weight of masonry mortar; and
  (d) up to about 7% by weight of cement;
wherein the total amount of masonry mortar and cement included in the dry component is at least about 10% by weight.

2. The protective composition of claim 1 wherein said mineral powder is a pottery grade of feldspar.

3. The protective composition of claim 1 wherein said dry component further includes up to about 1% by weight of stearic acid and up to about 0.1% by weight of a powdered waterproofing agent.

4. The protective composition of claim 1 wherein said liquid component comprises ethylene vinyl acetate.

5. The protective composition of claim 4 wherein said liquid component further includes up to about 55% by weight of water, up to about 1% by weight of a defoamer, and up to about 1% by weight of aqua ammonia.

6. The protective composition of claim 2 wherein the particle size of the pottery grade feldspar is approximately No. 200 grade mesh.

7. The protective composition of claim 1 wherein the particle size of the feldspar aggregate is approximately No. 20 grade mesh.

8. The protective composition of claim 2 wherein said dry component includes about 38% by weight of pottery grade feldspar and about 45% by weight of feldspar aggregate.

9. The protective composition of claim 8 wherein said dry component includes about 13% by weight of masonry mortar and about 4% by weight of cement.

10. A protective composition comprising a dry component including
   (a) about 40–50% by weight of feldspar aggregate;
   (b) about 35–40% by weight of pottery grade feldspar;
   (c) about 10–15% by weight of masonry mortar;
   (d) about 3–7% by weight of cement;
   (e) up to about 1% by weight of stearic acid; and
   (f) up to about 0.1% by weight of a powdered waterproofing agent;
and a liquid component formed of an adhesive copolymer in an aqueous emulsion, said liquid component being mixed with the dry component in an amount necessary to produce a desired consistency of the composition suitable for use as a paving, coating or sealing material.

11. The protective composition of claim 10 wherein said liquid component comprises ethylene vinyl acetate.

12. The protective composition of claim 11 wherein said liquid component further includes up to about 55% by weight of water, up to about 1% by weight of a defoamer, and up to about 1% by weight of aqua ammonia.

13. The protective composition of claim 10 wherein the particle size of the pottery grade feldspar is approximately No. 200 grade mesh.

14. The protective composition of claim 10 wherein the particle size of the feldspar aggregate is approximately No. 20 grade mesh.

15. The protective composition of claim 10 wherein said dry component includes about 38% by weight of pottery grade feldspar and about 45% by weight of feldspar aggregate.

16. The protective composition of claim 15 wherein said dry component includes about 13% by weight of masonry mortar and about 4% by weight of cement.

17. The protective composition of claim 10 wherein said dry component includes about 45% by weight of No. 20 grade mesh feldspar aggregate, about 38% by weight of No. 200 grade mesh pottery grade feldspar, about 13% by weight of masonry mortar, about 4% by weight of cement, about 0.003% by weight of stearic acid and about 0.0005% by weight of a powdered waterproofing agent.

* * * * *